May 25, 1965  R. D. HULL  3,185,405
SPINNING REEL HAVING A COMBINED FEATHERING
AND LINE PICK-UP MEANS
Original Filed June 10, 1960  4 Sheets-Sheet 1
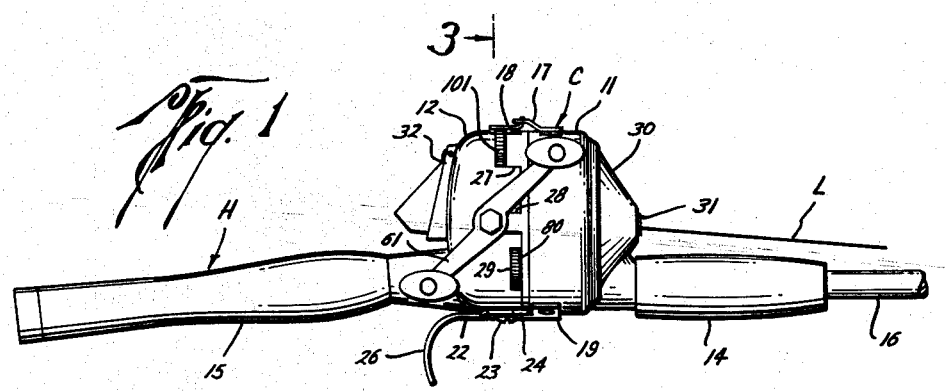
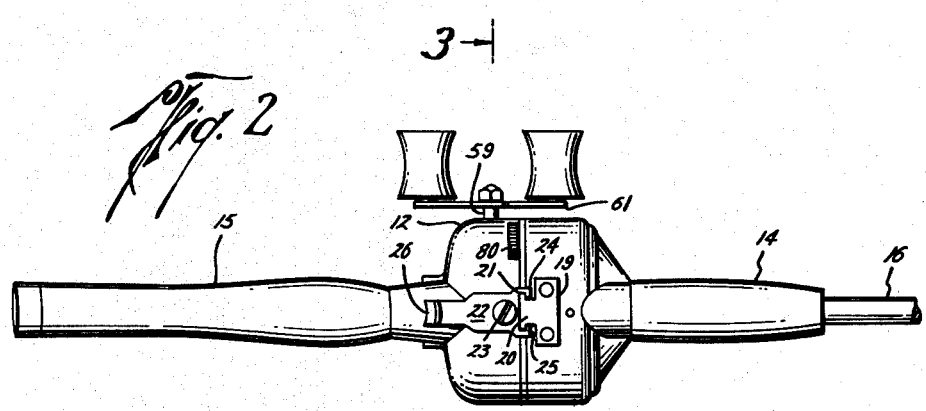
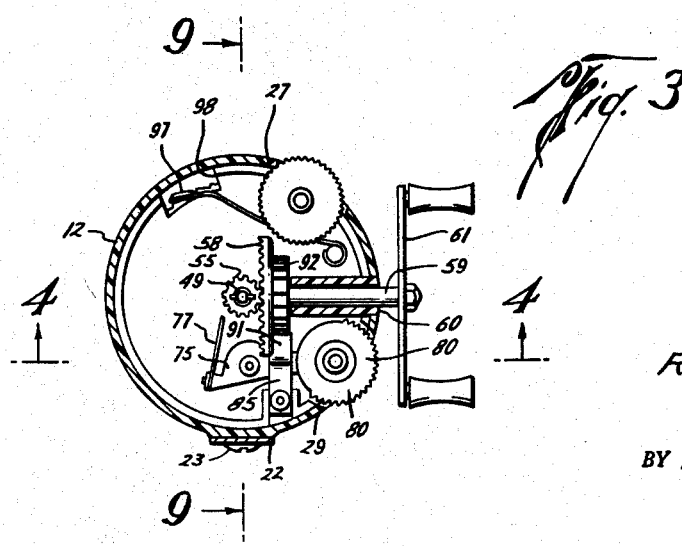
R. Dell Hull
INVENTOR.
BY
ATTORNEYS

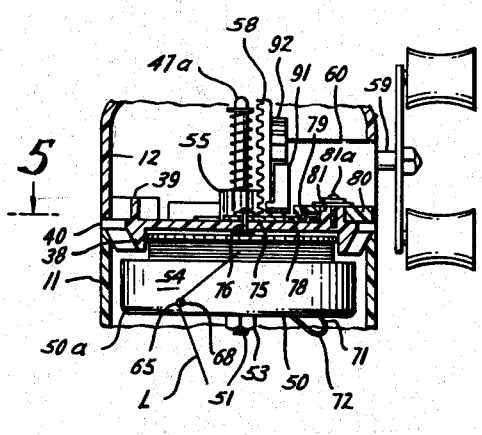
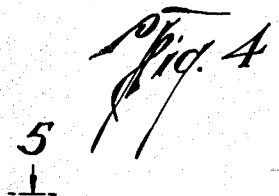
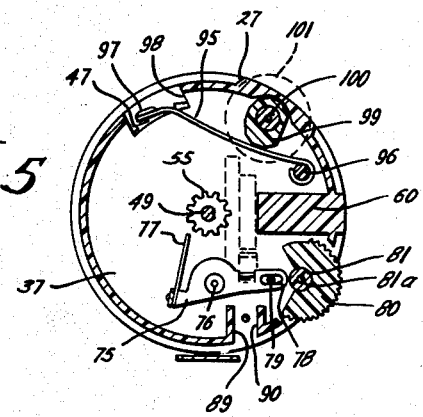
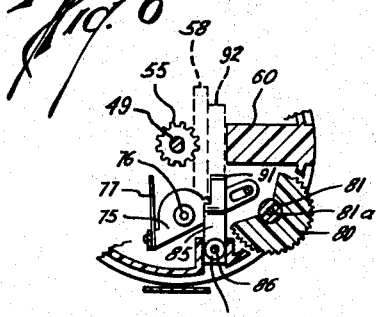
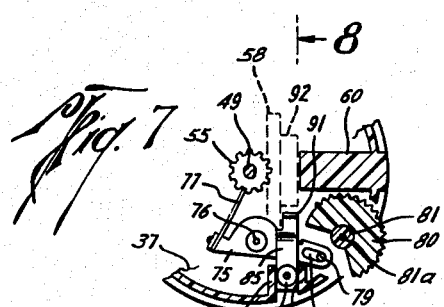
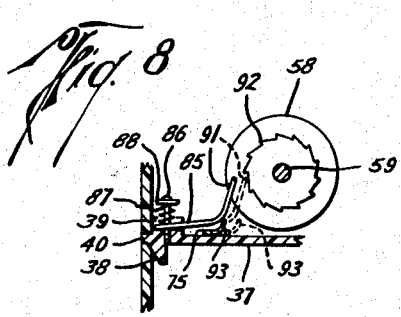
R. Dell Hull
INVENTOR.

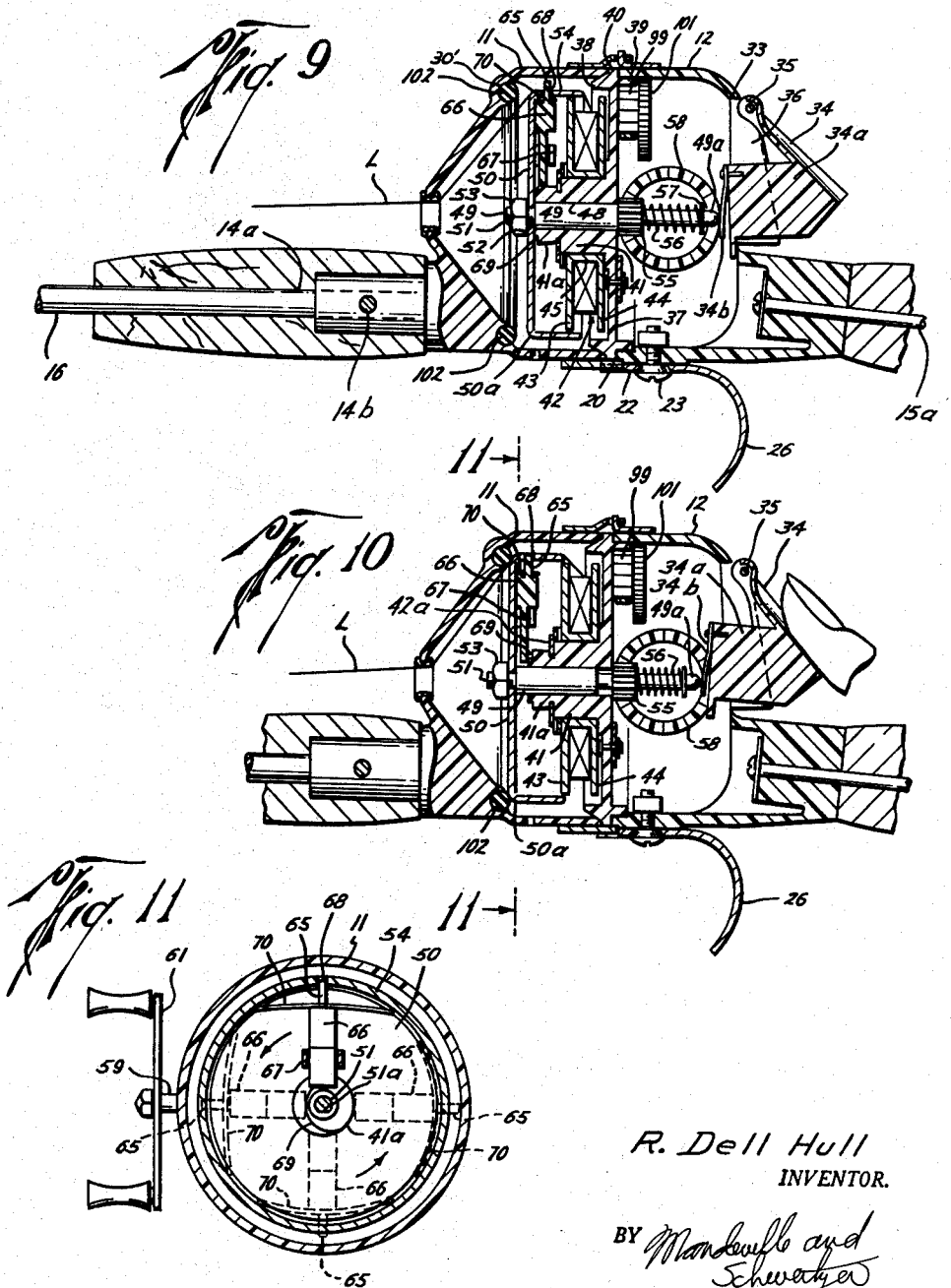

May 25, 1965
R. D. HULL
3,185,405
SPINNING REEL HAVING A COMBINED FEATHERING
AND LINE PICK-UP MEANS
Original Filed June 10, 1960
4 Sheets-Sheet 4
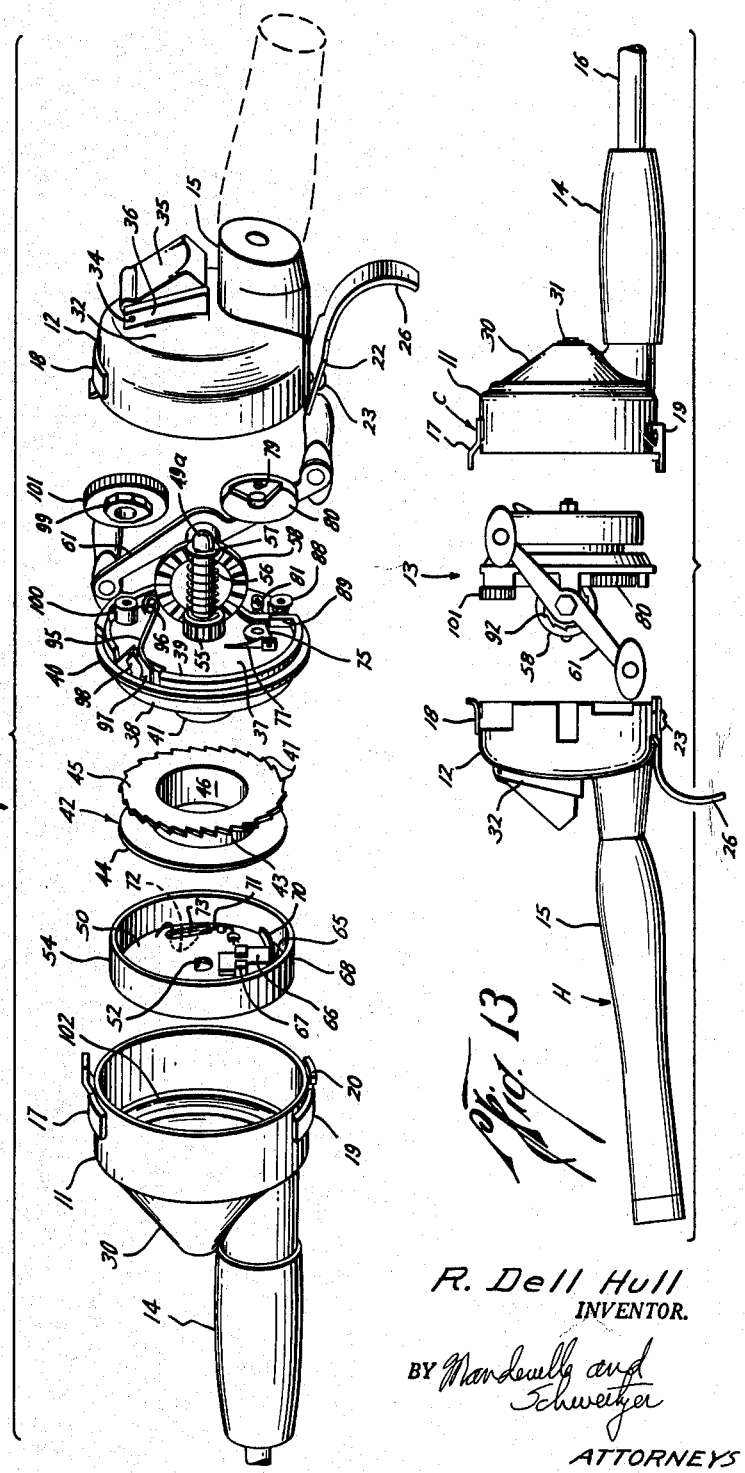
R. Dell Hull
INVENTOR.
BY
ATTORNEYS

United States Patent Office 3,185,405
Patented May 25, 1965

3,185,405
SPINNING REEL HAVING A COMBINED FEATHERING AND LINE PICK-UP MEANS
R. Dell Hull, 1131 E. Easton St., Tulsa 1, Okla.
Application May 22, 1961, Ser. No. 111,527, now Patent No. 3,123,319, dated Mar. 3, 1964, which is a division of application Ser. No. 35,353, June 10, 1960, now Patent No. 3,020,665, dated Feb. 13, 1962. Divided and this application May 14, 1963, Ser. No. 280,310
3 Claims. (Cl. 242—84.2)

This application is a division of my copending application Serial No. 111,527, filed May 22, 1961, now Patent No. 3,123,319, which is in turn a division of Serial No. 35,353, now Patent No. 3,020,665.

The present invention relates to fishing reels and is directed more specifically to improvements in closed face spinning reels. Closed face spinning reels of known design usually include a normally non-rotatable line spool mounted on an axis parallel to the rod and enclosed by a reel housing. The reel housing or casing is provided at its forward end with a central opening, through which the line passes in either direction, and pay out or retrieval of line is effected by revolving movements of the line, in winding or unwinding directions, about the line spool. A rotatable pick-up element is provided for winding the line about the spool during retrieval and appropriate feather and line brake means are provided to control and prevent, respectively, the pay out of line.

In one form of closed face spinning reel a line pick-up means is provided by means of a rotatable pick-up head mounted in partially surrounding relation to the line spool and in a reel of this type, line braking action may be effected by forward movements of the pick-up head into contact with the front face of the reel housing or casing.

The present invention is directed specifically toward the last described form of reel and is concerned more specifically with a novel form of a combination feathering and pick-up means utilizing forward movements of the pick-up head to engage the line during casting by a feathering finger mounted on the pick-up head.

In accordance with a more specific aspect of the invention a novel and improved feather brake means is provided for a reel of the type described which is simplified, durable and reliable and which affords a particularly advantageous feather braking action. In this respect, the improved feather braking means of the invention, while providing feathering action by, in effect, brushing the line as it passes between the pick-up head and the front wall of the reel casing, effectively controls the line as it is passed out from the reel during casting.

The reel of the present invention provides an improvement over earlier feathering arrangements in that the forward movement of the pick-up head, itself, moves the feather brake into play. Another aspect of the present invention is a new arrangement of a pick-up pin support and its guide keeper in combination with a reel construction in which forward movement of the pick-up head is utilized to effect feathering, full braking, and pick-up pin retraction. The new and improved arrangement is simple, economical, capable of manufacture without undue regard for machining and other tolerances, and is especially reliable in operation.

Other and more specific aspects and advantages of this invention will become more readily apparent from the following detailed description when read in conjunction with the accompanying drawing which illustrates a useful embodiment in accordance with this invention.

In the drawing:

FIG. 1 is a side elevational view of the combination rod handle and reel structure in accordance with this invention, shown in its assembled operative condition;

FIG. 2 is a bottom view of the assembled structure shown in FIG. 1;

FIG. 3 is a transverse sectional view taken generally along line 3—3 of FIG. 1;

FIG. 4 is a cross-sectional view taken generally along line 4—4 of FIG. 3;

FIG. 5 is a transverse sectional view taken along line 5—5 of FIG. 4 and illustrating particularly one position of the click and anti-reverse elements of the reel;

FIGS. 6 and 7 are fragmentary views similar to FIG. 5, illustrating additional positions of the click and anti-reverse elements;

FIG. 8 is a fragmentary sectional view taken along line 8—8 of FIG. 7;

FIG. 9 is a vertical longitudinal sectional view taken along line 9—9 of FIG. 3, showing the parts of the reel in the line pick-up or re-winding position;

FIG. 10 is a view similar to FIG. 9, but showing the parts of the reel at a stage preparatory to casting;

FIG. 11 is a transverse sectional view taken along line 11—11 of FIG. 10, illustrating several positions of the pick-up pin at different stages in the rotation of the pick-up head;

FIG. 12 is an exploded perspective view of the complete structure; and

FIG. 13 is an exploded view of the rod handle and reel structure, the reel being shown in its assembled form.

Referring to the drawing, there is shown a reel casing of generally cylindrical form comprising a front portion 11 and a rear portion 12 adapted to be separably joined together coaxially, as will be more fully described hereinafter, to form the casing C for enclosing a spinning reel comprising the sub-assembly, designated generally by the numeral 13 (FIG. 13), which is adapted to be inserted bodily as a unit into the casing to form therewith a closed-face type spinning reel. Casing portions 11 and 12 are joined directly to forward and rearward handle portions 14 and 15, respectively, of a fishing rod handle H, by any suitable means such as the screws 14b and 15a (FIG. 9). Handle portion 14 constitutes the forward or chuck portion of the handle and is provided with a socket 14a (FIG. 9) opening to its forward end and adapted to receive and to have secured therein, by means of the screws 14b, the butt end of a fishing rod 16 of any suitable and conventional form. Forward handle portion 14 and rearward handle portion 15 constitute a double-grip type handle commonly used for heavy duty service, such as in surf fishing, and both portions are suitably and conventionally shaped and constructed for this purpose, as shown.

Casing portions 11 and 12 are adapted to be hingedly and releasably connected together by means of co-operable hinge clips 17 and 18 mounted on top of casing portions 11 and 12, respectively, adjacent the confronting ends of the casing portions. Diametrically opposite the hinge clips 17 and 18 the casing portions are provided with releasable lock means comprising a lug plate 19 fixedly secured to casing portion 11 and carrying a rearwardly projecting flat lug 20 having lips 21 extending laterally from the opposite side edges of lug 20 at its rearward end. A locking arm 22 is pivotally secured to reel casing portion 12 by means of a pivot screw 23, which is threaded into casing portion 12 so that by loosening the pivot screw the arm 22 will be loosened for both pivoted movement about the pivot screw and for rocking movement toward and away from casing portion 12. At its forward end arm 22 is provided with a flat C-shaped jaw 24 adapted snugly to receive lug 20 and provided with inwardly turned lips 25 adapted to engage behind lips 21 when arm 22 is pivoted to align jaw 24 with the end of lug 20. When so aligned, by tightening pivot screw 23, jaw 24 will co-operate with lug 20 to lock the casing parts rigidly together. To release this lock, pivot screw 23 is loosened by unscrewing, the rear portion of arm 22 may then be rocked upwardly toward casing portion 12, thereby swinging jaw 24 below lug 20, and by then turning arm 22 to one side jaw 24 may be swung out of alignment with lug 20, thereby releasing casing portion 11 from casing portion 12 and allowing the former to be swung upwardly about the pivoted connection provided between clips 17 and 18 to thereby permit separation of the portions of the casing. The rear end portion of arm 22 may be provided with a downwardly and forwardly curved finger grip 26, such as is conventionally employed in casting rods.

Rear casing portion 12 is provided in its forward edge with circumferentially spaced slots 27, 28 and 29 (FIG. 1) which are adapted to receive portions of the sub-assembly 13 in order to permit the latter to be properly seated inside the casing and permit operating members thereof to project outside the casing. Forward casing portion 11 is formed to provide a forwardly tapering, generally conical front face 30, the center of which is pierced by an eye 31 through which the fishing line L passes. The rear wall 32 of rear casing portion 12 is provided with a generally rectangular opening 33 in which a thumb pressure block 34 is hingedly mounted. The latter has its upper end pivoted on a hinge pin 35 extending transversely between the upper ends of a pair of support lugs 36 projecting rearwardly from wall 32 adjacent the opposite side edges of opening 33. The free end of block 34 is provided with an angular extension 34a which projects forwardly through opening 33 and has a leaf spring 34b mounted on its forward end (FIGS. 9 and 10). By means of the pivoted connection of the pressure block, extension 34a will be mounted for swinging movement through opening 33 for controlling the operation of the reel, which will be more fully described hereinafter.

The sub-assembly 13 comprising the reel structure proper includes a circular mounting plate 37 adapted to be positioned transversely of casing C and provided at its forward and rear faces with forwardly and rearwardly extending flanges 38 and 39, respectively, the latter being disposed radially inwardly of the periphery of plate 37, whereby to define an outwardly projecting annular rim 40, the diameter of which is such that when plate 37 is inserted between the portions of casing C, the confronting ends of casing portions 11 and 12 will slidably receive the respective flanges 38 and 39 and the confronting edges of the casing portions will abut the opposite faces of rim 40, whereby to clamp base plate 37 and the reel structure supported thereby between the casing portions when the latter are connected together to form the final operating structure. Plate 37 is provided with a central forwardly projecting cylindrical boss 41 which is preferably integrally formed with plate 37, but which may be otherwise secured to the forward face thereof in any known manner. The forward end of boss 41 is reduced somewhat in diameter forming the boss extension 41a.

A line spool, designated generally by the numeral 42, has the line L wound thereon and comprises a hollow hub 43, an annular front flange 44, and an annular rear flange 45. Hub 43 has an axial opening 46 adapted to slidably receive boss 41. The edge of rear flange 45 is provided with ratchet teeth 47, for purposes to be subsequently described. A spring clip 42a removably secures spool 42 in place on boss 41.

Boss 41 has an axial bore 48 in which is rotatably and slidably journalled a cylindrical shaft 49 which projects through bore 48 both rearwardly of plate 37 and forwardly of boss extension 41a. A line pick-up head 50 is mounted on the forward end of shaft 49 for rotational and axial movement by corresponding movements of shaft 49. The latter has on its forward end a threaded pin 51 which projects through a central opening 52 in the pick-up head to receive a nut 53 to thereby provide means by which the pick-up head may be releasably secured to shaft 49. Pin 51 has a flat 51a at one side and opening 52 is correspondingly shaped, as best seen in FIG. 11, to lock pick-up head 50 against rotation relative to shaft 49.

Line pick-up head 50 is generally circular and is formed with a generally cylindrical, rearwardly extending peripheral flange 54, which is adapted to extend rearwardly over the periphery of front flange 44 of the spool to a point intermediate flanges 44 and 45 when the pick-up head is in the retracted position against the forward end of boss extensions 41a (FIG. 9). The rearward end portion 49a of shaft 49 which projects rearwardly through plate 37 is reduced in diameter, and the reduced diameter portion has mounted thereon a spur gear 55 which is suitably splined to the shaft portion 49a to permit relative axial movement of the shaft through the gear without relative rotation therebetween. A coil spring 56 is positioned about shaft portion 49a and held in compression between gear 55 and a stop ring 57 mounted on the rearward end of shaft portion 49a. Spring 56 serves to urge shaft 49 resiliently to its rearward position (FIG. 9), while at the same time, thrusting gear 55 against the rear face of mounting plate 37, which serves as a bearing for the gear. A face gear 58 is mounted on a drive shaft (FIG. 3) and is disposed to mesh with spur gear 55. Shaft 59, which extends substantially at right angles to shaft 49, is suitably journalled in a bearing 60 mounted on the rear face of plate 37 (FIGS. 3 and 4), and is of a length sufficient to project from the side of casing C when the structure is assembled (FIGS. 2, 3 and 4). The outer end of drive shaft 59 carries a handle 61 which may be rotated in order to drive shaft 49 through the intermeshing gears 55 and 58. Rotation of shaft 49 will drive pickup head 50, which will be rotated in counterclockwise direction (as viewed from the front of the reel) in order to wind the line on the spool.

Pick-up head 50 carries on its inner face line pick-up and line-feathering elements. The pick-up elements, as best seen in FIGS. 9, 10 and 11, comprise a pick-up pin 65 mounted in the outer end of a slide block 66 which is mounted to slide radially along the inner face of the pick-up head in an enclosing guide keeper 67 secured to the inner face of pick-up head 50. Pick-up pin 65 is disposed in registration with an opening 68 in flange 54 for projection and retraction therethrough in response to movements of the pick-up head, as will be subsequently described. Pick-up pin 65 extends through a bow spring 70 which bears against the outer end of slide block 66 and also against spaced portions of the inner wall of flange 54, whereby to normally urge slide block 66 radially inwardly, thereby urging pick-up pin 65 to its retracted position inside the outer periphery of flange 54, as seen in FIGS. 10 and 11.

Pick-up head 50 also carries a line feathering finger 71 (best seen in FIGS. 4 and 12) which has one end mounted on the inner face of pick-up head 50. The opposite end of finger 71 is reversely bent to provide the tip 72 of rounded configuration, as illustrated, which projects through a slot 73 in the wall of the pick-up head to one side of the center thereof. Tip 72, which may be made of spring wire, projects forwardly to a position where, when the pick-up head is thrust forwardly during operation of the reel, as will be subsequently described, it will be brushed by line L as the latter spins off of spool 42. The friction resulting from the engagement of the line with the spring finger serves to give the operator a measure of control of the rate at which the line is drawn from the reel by the lure, particularly during the final stages of the cast, in response to pressure exerted by the operator through thumb block 34, as will appear hereinafter.

The reel herein described also includes improved anti-reverse and click mechanisms, as best seen particularly in FIGS. 3 to 8, inclusive. The click structure comprises a flat lever 75 pivoted on a pin 76 projecting from the rear face of plate 37. At its inner end, lever 75 carries a flexible spring finger 77 extending at an angle to the longitudinal axis of the lever and adapted to have its free end swung into ratcheting engagement with the teeth of gear 55 at one position of the lever (FIG. 7), and to be swung away from engagement with gear 55 at other positions of the lever (FIGS. 5 and 6). At its outer end lever 75 is provided with a longtudinal crank slot 78 which is adapted to receive a crank pin 79 mounted on the inner face of a circular crank 80 and projecting toward the rear face of plate 37. Crank 80 is pivotally mounted on the rear face of plate 37 near its outer edge about a cylindrical pivot boss 81 and secured thereto by means of a pin 81a. It will be seen that by angular movement of crank 80 in one direction about pivot boss 81, the slot lever-and-crank pin connection between crank 80 and lever 75 will act to swing lever 75 in one direction to move click finger 77 into clicking engagement with the teeth of gear 55 (FIG. 7), and when crank 80 is moved angularly in the opposite direction, the lever will be swung in the direction to retract finger 77 from gear 55 (FIG. 6).

The anti-reverse elements operate in conjunction with lever 75 and comprise a pawl 85 having one end loosely secured to a post 86 mounted on the rear face of plate 37 and urged toward the plate by a coil spring 87 positioned about post 86 between a head washer 88 and the end of pawl 85. The loose fitting connection between the end of pawl 85 and post 86 permits the free end of the pawl to be moved outwardly and inwardly with respect to the rear face of plate 37 between a pair of guide blocks 89 and 90 mounted on the rear face of plate 37. The free end of pawl 85 has an upwardly (with respect to the rear face of plate 37) turned finger 91, which is adapted to engage ratchet teeth 92 mounted at the back of gear 58 when the pawl is moved a sufficient distance inwardly toward plate 37. To accomplish such inward movement, lever 75 is provided with an up-turned lug 93 at a point intermediate pivot 76 and slot 78 which is in alignment with the underside of pawl 85. In the neutral and click-engaging positions of lever 75, shown respectively in FIGS. 5 and 7, lug 93 will be positioned beneath pawl 85 so as to be operative to lift the pawl away from plate 37 and thus to move finger 91 out of the path of ratchet teeth 92 (FIG. 8). In the fully retracted position of the lever, illustrated particularly in FIG. 6, lug 93 will have been moved to a position where it is out from under pawl 85, thereby releasing the latter for movement inwardly toward plate 37 and allowing finger 91 to move into the path of ratchet teeth 92 (shown in broken lines in FIG. 8). Crank 80 is positioned on plate 37 so that a portion thereof, having a knurled edge, projects through slot 29 in casing portion 12 and is operable by the thumb of the operator to move the crank between these positions illustrated particularly in FIGS. 5, 6 and 7. In the neutral position (FIG. 5) both the click finger 77 and anti-reverse finger 91 will be out of engagement with gear 55 and ratchet teeth 92, respectively, thereby permitting reverse rotation of the pick-up head and obviating the clicking sound. In the position illustrated in FIG. 6, the click is inoperative but the anti-reverse finger 91 is in engagement with ratchet teeth 92. Thus, reverse rotation of the pick-up head is prevented. In the position, illustrated in FIG. 7, the click is engaged, while the anti-reverse pawl is disengaged.

As best seen in FIGS. 3, 5 and 12, the reel structure is provided with a "drag" for the line spool in order to regulate the tension which may be applied to the line before the line spol is permitted to slip about portion 41 in order to prevent breakage under an excessive pull. This drag means comprises a leaf spring 95 pivoted at one end about a pivot boss 96 which projects from the rear face of mounting plate 37. The free end of leaf spring 95 has a forwardly turned lug 97 which projects through an arcuate slot or window 98 provided in plate 37 near the periphery thereof opposite a segment of serrated edge 47 of rear flange 45 of the line spool. Lug 97, which functions as a brake shoe, is positioned so as to ride on serrated edge 47 and is urged against this edge by means of a stepped cam 99, which engages a medial portion of leaf spring 95 and is rotatably mounted on a pivot boss 100 projecting from the rear face of plate 37. Cam 99 is shaped so that as it is rotated about boss 100 it will apply increasing or decreasing pressure, depending on the direction of rotation, against leaf spring 95, which will, in turn, transmit this pressure in the form of frictional drag of lug 97 on serrated edge 47 of the line spool flange. A knurled drive disk 101 is secured to cam 99 and arranged to have its knurled periphery projecting through opening 27 in rear casing portion 12 to the exterior of the casing at a point at one side and near the top of the casing, as shown in FIGS. 1 and 3, where it may be readily contacted by the thumb or finger of the operator for adjusting the tension on the drag spring. The serrations 47 co-operate with lug 97 to provide a clicking sound when the tension on the fishing line is great enough to overcome the resisting pressure of drag spring 95 and produce rotation of the spool around boss 41.

The sub-assembly 13 comprises all of the reel structure carried on mounting plate 37, as heretofore described, and is insertable bodily in casing C. Ordinarily, the sub-assembly will be inserted in rear portion 12, drive shaft 59 being slipped into notch 28, drag disk 101 fitted into notch 27, and crank disk 80 fitted into notch 29, as best seen in FIG. 1. Line L will, of course, be threaded through eye 31 and the forward portion 11 of the casing will be hooked to the rear portion by means of the hinge clips 17 and 18, and the parts locked in the assembled position by means of the engagement of jaw 21 about the rearward end of lug 20, as previously described. When the casing portions, their attached handle portions and the reel structure have thus been assembled, spring 34b on the inner end of thrust block 34a will normally rest against the rearward end of shaft portion 49a in position to be manipulated in the casting and retrieving operations of the reel.

The operation of the reel will now be described, reference being had particularly to FIGS. 9, 10 and 11 which illustrate several steps in the operation. Referring first to FIG. 9, which illustrates the position of the reel parts when the line is being retrieved and wound about spool 42, it will be noted that pick-up head 50 has moved to its innermost position at which it bears against the forward end of boss extension 41a, and line L is engaged by pick-up pin 65 which projects outwardly through opening 68 in pick-up head flange 54. FIG. 10 shows the first step of the casting position, which is also a temporary braking position for holding the line against outward movement. Pressure will have been applied to pressure block 34 to move extension 34a inwardly of the casing, whereby the forward end of extension 34a, acting through spring 34b, will urge shaft 49 forwardly to thereby move pick-up head 50 forwardly until its forward peripheral edge, indicated at 50a and slightly rounded as shown, engages an annular brake ring 102, which may be in the form of a conventional O-ring formed of rubber or the like, which is mounted on the inner wall of front face 30 of the casing substantially in registration with the line of contact of edge 50a with front face 30. Advantageously, the conical front face 30 of the reel casing is formed to provide, adjacent the base of the cone, an annular recess 30' of substantial cross-sectional arc. The O-ring 102 is received and retained in the recess and has a portion exposed and facing rearwardly for engagement with the pick-up head.

The engagement of edge 50a with O-ring 102 under the thumb pressure of the operator, will serve to grip the line between the pick-up head and ring 102, and thereby stop its outward movement. Thus, the line and the lure attached thereto can be held against outward movement while the casting movement of the rod is begun. Thumb pressure is relieved from pressure block 34 and spring 56 will thereupon act on shaft 49 to draw pick-up head 50 rearwardly out of contact with ring 102, thereby freeing the line for outward movement. The cast may then be made, occurring contemporaneously with the release of thumb pressure on pressure block 34. As the lure is in flight, re-application of thumb pressure, less than that necessary to move edge 52 into engagement with ring 102, will position feathering finger 72 in the path of movement of the line as it unwinds from the spool, the farther the head is moved forwardly, the greater will be the extent of the brushing contact of the line with the finger and the greater the resulting measure of restraint on the outward flow of the line. Thus, the line can be feathered during the cast in order to control and improve the accuracy of the cast.

When pick-up head 50 is moved forwardly, as previously noted, the inner end of slide block 66 will be moved in front of the forward end of boss extension 41a, as best seen in FIG. 10. When the pressure on block 34 is relaxed to release the line, the pick-up head carrying slide block 66 will be drawn back toward the forward end of boss extension 41a, but this rearward movement will be stopped by engagement of the inner end of slide block 66 with the end of this extension. Thus, pick-up pin 65 will be held in its inwardly retracted position under the pressure of spring 70 while the line is moving outwardly and pin 65 will remain in this retracted position until line retrieving operations are begun.

When the cast has been completed, it is necessary for the pick-up head to be retracted to its maximum rearward position, as shown in FIG. 9, in order to retrieve the line. It is necessary, therefore, to cause slide block 66 to move radially outwardly from its engagement with the forward end of boss extension 41a in order to project pick-up pin 65 to its pick-up position and to allow the completion of the retractive movement of the pick-up head. This additonal retraction is effected upon the initial rotation of the pick-up head in the pick-up direction by providing on the forward end of boss extension 41a an arcuate cam 69 (see particularly FIG. 11). As the rotation of the pick-up head occurs, the deepest part of the cam will move beneath the inner end of slide block 68 and will allow the latter, in response to the rearward movement of the pick-up head under the urging of spring 56, to move up on to this portion of the cam, as shown in broken lines at the left-hand side of FIG. 11. As rotation of the pick-up head continues in the direction indicated by the arrows in FIG. 11, the inner end of slide block 66 will be forced radially outwardly by the cam surface in order to project pick-up pin 65 to its outermost position (the broken line positions at the bottom and right-hand side of FIG. 11), the inner end of the slide block thus being raised to the level of the outer periphery of boss extension 41a, on to which the inner end of the slide block will be moved in response to the retractive pressure of spring 56, which will retain the slide block in this position throughout the rotation of the pick-up head while rewinding the line on spool 42; that is, the slide block 66 and pick-up pin 65 will be in the positions illustrated particularly in FIG. 9. When retrieving the line has been completed in this manner, the reel is ready for another cast in the manner previously described.

During the operation of the reel, the positions of the click and anti-reverse elements, as well as of the drag spring, may be adjusted, as desired, by the operator.

One of the specific, advantageous features of the invention resides in the new arrangement of pick-up pin support or slide block 66 and its guide keeper 67, in combination with a reel construction in which forward movement of the pick-up head 50 is utilized to effect feathering, full braking and pick-up pin retraction. Thus, were both feathering and full braking are accomplished by forward movement of the pick-up head, a substantial range of forward movement is advantageous to afford more delicate control during feathering. This introduces a collateral problem, however, as it normally would cause the pick-up pin to become retracted during an initial portion of the forward movement of the pick-up head and substantially in advance of engagement of the head with the brake ring 102. If this were allowed to occur, the line would be released for a substantial interval upon depressing the block 34 in preparation for making a cast. This would permit line to be drawn out by the weight of the lure, unless the actuation of the pressure block 34 were extremely rapid.

The problem discussed above has been obviated in the reel of the present invention by proportioning the slide block 66 and guide keeper 67 in a manner to accommodate a predetermined, significant amount of movement of the lower end of the slide block relatively toward and away from the front face of the pick-up head 50. This permits the base of the slide block 66 to remain on the boss extension 41a throughout much of the forward movement of the pick-up head 50 and to an instant coinciding with or immediately prior to engagement of the pick-up head with the brake ring 102.

In the illustrated, advantageous form of the invention, the base (inner) portion of the slide block 66 is of substantially less thickness than the head portion, and the guide keeper is provided with confining flanges spaced from the front wall of the pick-up head a distance substantially (e.g., 1½ times) greater than the thickness of the base portion of the slide block but less than the thickness of its head portion. The guide keeper thus serves two functions, in addition to that of guiding the slide block; it limits radially inward movement of the block by engaging its head portion, as indicated in FIG. 10; is also, and as an important function, permits the base of the slide block to swing away from the adjacent wall of the pick-up head 50, during forward movement of the latter, so that the slide block remains supported in a radially outward position, as shown in FIG. 9, throughout an extended portion of the forward movement of the pick-up head.

From the foregoing, it will be seen that the present invention provides a compact, simply constructed reel assembly which may be easily and quickly assembled and dis-assembled, which is substantially trouble-free in operation, and which is rugged enough for use under heavy-duty conditions, as in fishing for salt-water fish. The new pick-up and feathering arrangement, while being particularly effective in operation, is simplified and economical, makes use of standard components and conventional fabricating techniques.

It will be understood, however, that various alterations, modifications and changes may be made in the details of the illustrative embodiment of this invention without departing from the clear teachings of the disclosure. Accordingly, reference should be made to the following appended claims in determining the full scope of the invention.

I claim:

1. In a spinning reel of the type having a rotatable pick-up head, a stationary cover surrounding said pick-up head and having a portion spaced axially forwardly of said head a predetermined distance, a hub means mounting the pick-up head for axial movement with respect to said cover for effecting feathering action upon partial forward axial movement, and braking action upon full forward axial movement, and a line pick-up means carried by said pick-up head and held in line engaging position by a portion of said hub when said pick-up head is in a predetermined rearward position, and in retracted position when said pick-up head is in predetermined full forward position, the improvement in said pick-up means characterized by said means comprising, (a) a slide block mounted by said pick-up head for generally radial movement, (b) a pick-up element extending radially from said slide block and projectable beyond the periphery of said pick-up head into line engaging position, (c) said slide block having an inner control portion positioned for cooperative action with portions of said hub whereby to support said slide block in a radially outward position when said pick-up head is in a rearward position, (d) spring means urging said slide block radially inward, and (e) guide means on said pick-up head generally embracing said control portion and cooperating with said slide block to limit the movements of said pick-up element to a generally radial direction with respect to said pick-up head while accommodating relative axial movement of the inner control portion of said slide block with respect to said pick-up head substantially effectively equal to said predetermined distance between said pick-up head and cover, (f) whereby said inner control portion remains in contact with said hub portion during substantially the full forward movement of said pick-up head.

2. The spinning reel of claim 1 in which, (a) said slide block has an outer portion of substantially greater axial thickness than said inner portion, (b) said guide means embraces said inner portion and defines an axial guide space substantially larger than the thickness of said inner portion but smaller than the axial thickness of said outer portion, (c) said guide means and said outer portion cooperating to limit radially inward movement of said slide block.

3. In a spinning reel of the type having a rotatable pick-up head, a stationary cover surrounding said pick-up head and having a portion spaced axially forwardly of said head a predetermined distance, a hub means mounting the pick-up head for axial movement with respect to said cover for effecting braking action upon full forward axial movement, and a line pick-up means carried by said pick-up head and held in line engaging position by a portion of said hub when said pick-up head is in a predetermined rearward position, and in retracted position when said pick-up head is in predetermined full forward position, the improvement in said pick-up means characterized by said means comprising, (a) a slide block mounted by said pick-up head for generally radical movement, (b) a pick-up element extending radially from said slide block and projectable beyond the periphery of said pick-up head into line engaging position, (c) said slide block having an inner control portion positioned for cooperative action with portions of said hub whereby to support said slide block in a radially outward position when said pick-up head is in a rearward position, (d) spring means urging said slide block radially inward, and (e) guide means on said pick-up head generally embracing said control portion and cooperating with said slide block to limit the movements of said pick-up element to a generally radial direction with respect to said pick-up head while accommodating relative axial movement of the inner control portion of said slide block with respect to said pick-up head substantially effectively equal to said predetermined distance between said pick-up head and cover, (f) whereby said inner control portion remains in contact with said hub portion during substantially the full forward movement of said pick-up head.

References Cited by the Examiner
UNITED STATES PATENTS

| 3,028,115 | 4/62 | Hammer | 242—84.2 |
| 3,034,741 | 5/62 | Macy et al. | 242—84.2 |
| 3,059,873 | 10/62 | Hull | 242—84.2 |

MERVIN STEIN, *Primary Examiner.*